(12) United States Patent
Jespersen

(10) Patent No.: US 6,584,861 B1
(45) Date of Patent: Jul. 1, 2003

(54) TRANSMITTING AND RECEIVING CIRCUIT FOR ULTRASONIC FLOWMETER

(75) Inventor: Lars Jespersen, Sønderborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/678,759

(22) Filed: Oct. 3, 2000

(30) Foreign Application Priority Data

Oct. 14, 1999 (DK) ........................................ 1999 01477

(51) Int. Cl.$^7$ .............................. G01F 1/66; G01F 1/20
(52) U.S. Cl. .................................. 73/861.27; 73/861.18
(58) Field of Search .......................... 73/861.18, 861.27, 73/861.28, 861.31, 861.25

(56) References Cited

U.S. PATENT DOCUMENTS

| | | | | |
|---|---|---|---|---|
| 3,981,191 A | * | 9/1976 | Brown et al. ............. | 73/194 A |
| 4,541,437 A | * | 9/1985 | Amemiya ................... | 128/663 |
| 4,588,917 A | * | 5/1986 | Ratcliff ....................... | 310/316 |
| 5,552,645 A | * | 9/1996 | Weng ......................... | 307/112 |
| 5,753,824 A | * | 5/1998 | Fletcher-Haynes ........ | 73/861.28 |
| 5,777,892 A | * | 7/1998 | Nabity et al. .............. | 364/510 |
| 6,003,385 A | * | 12/1999 | De Vanssay et al. ..... | 73/861.25 |

FOREIGN PATENT DOCUMENTS

| | | | | |
|---|---|---|---|---|
| EP | WO 94/17371 | * | 8/1994 | ............. G01F/1/66 |
| WO | WO 94/17371 A1 | | 8/1994 | |

* cited by examiner

*Primary Examiner*—Hezron Williams
*Assistant Examiner*—Lilybett Martir
(74) *Attorney, Agent, or Firm*—Barnes & Thornburg

(57) ABSTRACT

Transmitting and receiving circuit for an ultrasonic flowmeter, comprising at least two ultrasonic transducers arranged for the transmission and receipt of ultrasonic signals in opposite directions across a measuring distance, a signal source for controlled production of electrical signals for transmission to the ultrasonic transducers and detection means for deriving transmission time measurements, used to calculate the flow, measuring of which is desired. The transmitting and receiving circuit includes an amplifier with a first inverting input terminal for connection to an ultrasonic transducer, a second non-inverting input terminal for connection to the signal source, an output terminal for connection with the detection means, and a feedback connection between the output terminal and the first input terminal. Switching means is provided for alternating functional connection of one of the ultrasonic transducers with the first input terminal provides a simplified circuit arrangement with a high degree of immunity towards component tolerances and different temperature coefficients.

7 Claims, 2 Drawing Sheets

US 6,584,861 B1

TRANSMITTING AND RECEIVING CIRCUIT FOR ULTRASONIC FLOWMETER

BACKGROUND OF THE INVENTION

The present invention concerns a transmitting and receiving circuit for ultrasonic flowmeters of the kind described in the preamble of claim 1.

In such circuits, it is known that measuring the very small time differences between the transmission of ultrasound upstream and downstream requires a very high degree of symmetry in the electronic circuits used for transmitting and receiving ultrasonic signals via the transducers, so that the group running time for signals in the electronic circuit itself is the same for both upstream and downstream signal transmission. It is also known that the impedances loading each transducer must be constant from the transmitting situation to the receiving situation to meet the condition of reciprocity of the sensor. This causes the upstream and downstream transmission times of the sensor to be equal when the medium stands still.

This problem is treated in WO 94/17371, which describes the use of two identical transmitting and receiving circuits, one for each transducer, which comprise an amplifier with a first input terminal for connection to an ultrasonic flow transducer, a second input terminal for connection to a signal source, an output terminal for connection to a detection circuit and a feedback connection between the output terminal and the first input terminal. Each of the circuits is able to work as a transmitting circuit or a receiving circuit, and their mode of functioning is switched by means of a switching arrangement or by switching both circuits between the transmitting and receiving function to obtain the transmission of ultrasonic signals in both directions. However, variations caused by component tolerances, different temperature coefficients and the like between two such circuits, will still enable both fixed and temperature dependent group running time differences for signals in the electronic circuits.

SUMMARY OF THE INVENTION

On the basis of this state of the art, the purpose of the present invention is to provide a transmitting and receiving circuit for ultrasonic flowmeters as mentioned in the introduction, with which it is possible to solve the problems with variations between two such circuits caused by component tolerances, different temperature coefficients and the like, and at the same time to obtain a simplification of the circuit used, and this purpose is met by means of a circuit of the kind mentioned, which, according to the present invention, also comprises the measures stated in the characterising part of claim 1. This arrangement provides a two-way transmission of ultrasonic signals with merely one single transmitting and receiving circuit of the kind mentioned, as the switching means in turn connect one of the ultrasonic transducers functionally with the first input terminal. With the arrangement described, component tolerances, different temperature coefficients and the like, will be equal for the transmission of ultrasound in the two opposite directions, so that the group running time for signals in the electronic circuit itself is equal for the transmission of ultrasound in the two opposite directions. This applies for both fixed and variable group running time differences, where the fixed differences are primarily caused by component tolerances and the variable differences are caused by temperature dependent parameters. When the fixed group running time difference is eliminated to zero, it is obtained that the zero point calibration/adjustment can be avoided, which removes error possibilities and saves time. For reasons of, for example, authority approvals, the temperature dependent group running time difference must be kept within fixed limits. When transmitting ultrasonic signals in a first direction, the circuit is connected with the first ultrasonic transducer by way of the switching means, while a signal is transmitted to the transducer and converted to an ultrasonic signal. Then the circuit is switched to be connected with the second ultrasonic transducer for receipt of the signal, which will be generated, when the second transducer receives the signal transmitted from the first transducer. When transmitting the ultrasonic signal in the opposite direction, the circuit is first connected with the second transducer for transmission and subsequently with the first transducer for reception.

Preferred embodiments according to the invention are described in the subclaims, suggesting different placings of the ultrasonic transducers and the switching means, preferred frequency ranges for the ultrasonic transducers and the opportunity of using more than two ultrasonic transducers.

BRIEF DESCRIPTION OF THE DRAWINGS

In the following detailed part of the present description, the invention is explained with reference to embodiments of a transmitting and receiving circuit for ultrasonic flowmeters according to the invention, as shown in the drawings, where.

DETAILED DESCRIPTION OF THE INVENTION

Figure 1:
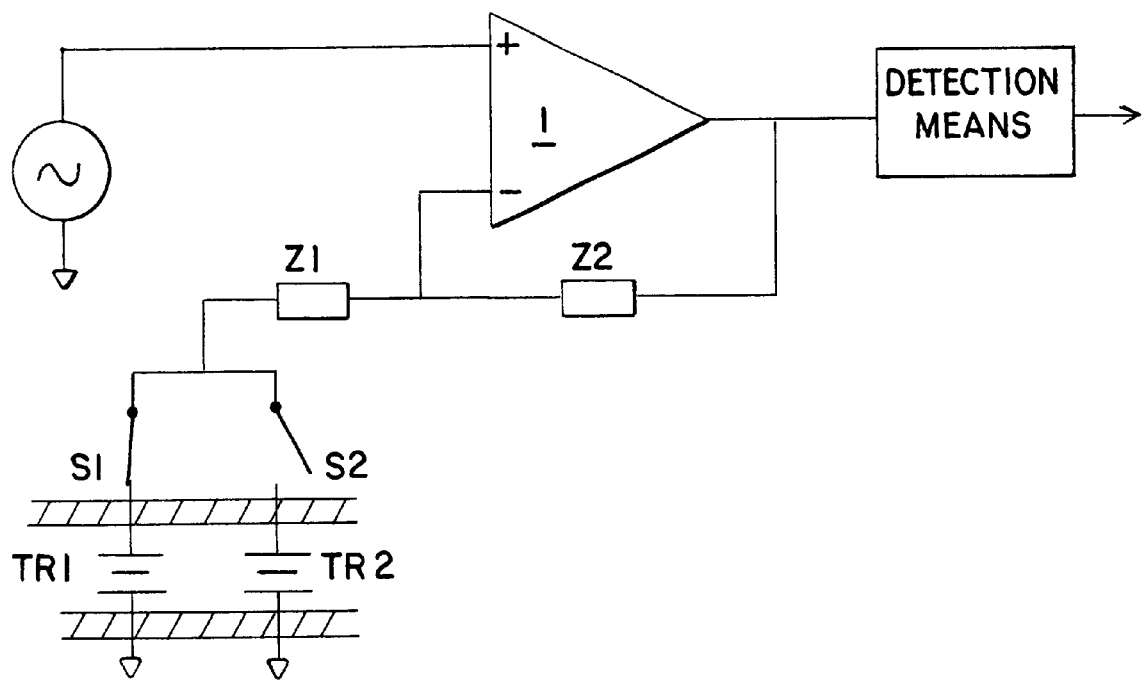
FIG. 1 shows in outline a transmitting and receiving circuit for ultrasonic flowmeters according to the invention, in which both ultrasonic transducers have one terminal connected to a reference potential and another terminal connected with the first input terminal of the amplifier via a switching means.

The transmitting and receiving circuit shown in FIG. 1 comprises an amplifier 1 with a first, inverting input terminal for connection with an ultrasonic transducer TR1, TR2, the connection being established via an impedance Z1 and switching means S1, S2. The second, non-inverting input is connected with a (only shown in FIG. 1) signal source, producing in a controlled manner electrical signals for transmission to the ultrasonic transducers TR1, TR2. A feedback connection is established between the output terminal and the inverting input terminal via an impedance Z2. The output terminal of the amplifier 1 is also connected with (not shown) detection means for the derivation of transit time measurements used for the calculation of the desired measured flow.

The circuit shown works as follows:

During transmission from TR1 to TR2, S1 is closed, and the signal source supplies the circuit with a suitable electrical signal, which is transmitted to the transducer TR1 via the amplifier 1, the impedances Z1 and Z2 and the switch S1. A suitable period after the transmission of an ultrasonic signal from TR1, before the signal is received by TR2, S1 is opened and S2 is closed for the receipt of the signal on TR2. The signal received by TR2 is transmitted to the amplifier 1 via the switch S2 and the impedances Z1, Z2 for delivery to the detection means on the output of the amplifier 1. When transmitting from TR2 to TR1, S2 is made, and suitable period after transmitting the ultrasonic signal, before it reaches TR1, S2 is broken and S1 is made for receipt of the ultrasonic signal on TR1. This shows that the position of S1 and S2 is always the same, no matter if a given transducer is transmitting or receiving, the transducer constantly seeing a constant impedance, which substantially corresponds to the impedance of the made switch S1, S2 and Z1.

The group running time differences in the amplifiers are eliminated, as the same amplifying element is used for both transducers, and the group running time differences in the switches S1, S2 are eliminated too, as both switches are part of the signal path, independently of the transmission direction.

One of the advantages of the shown circuit is that, given an ideal amplifier, the virtual ground of the inverting input of the amplifier has an impedance of 0 ohm, no matter whether the connected transducer is transmitting or receiving, which means that the transducer faces a constant impedance corresponding to Z1+the impedance of the relevant switch S1, S2. With non-ideal amplifiers, the impedance in the virtual ground will have a final value, which depends on the open-loop output impedance of the amplifier, Z1, Z2, the transducer impedance and the open-loop amplification of the amplifier in the frequency range, in which the transducer works. Usually, the load of the transducers will be different, but the reciprocity is maintained, as the load is constant from the transmitting to the receiving situation. The usual transducer frequency range lies between about 40 KHz up to a few MHz.

Figure 2:
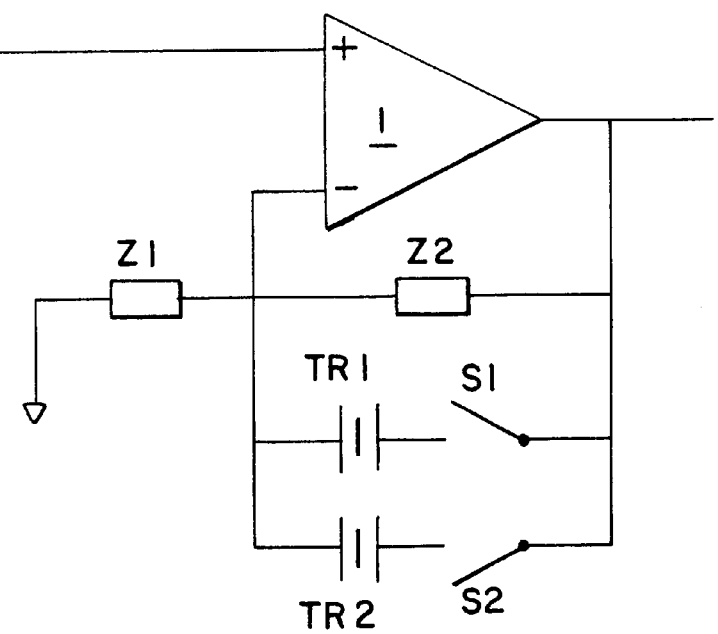
FIG. 2 shows a second embodiment of the invention, in which two ultrasonic transducers in series with switching means are connected in parallel with the feedback connection on the amplifier.
Figure 3:
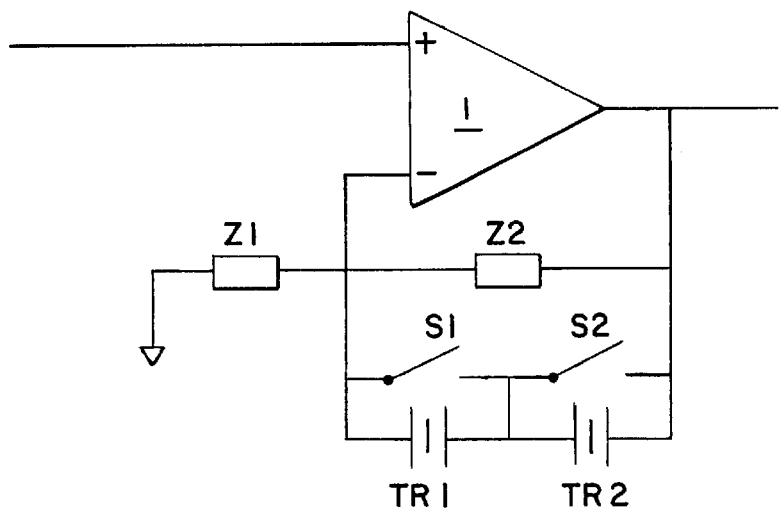
FIG. 3 shows a third embodiment, substantially corresponding to FIG. 2, in which the switching means are arranged in parallel with each of the transducers for a short-circuiting of the non-used transducer, and the transducers are connected in series between the output terminal and the first input terminal of the amplifier.
Figure 4:
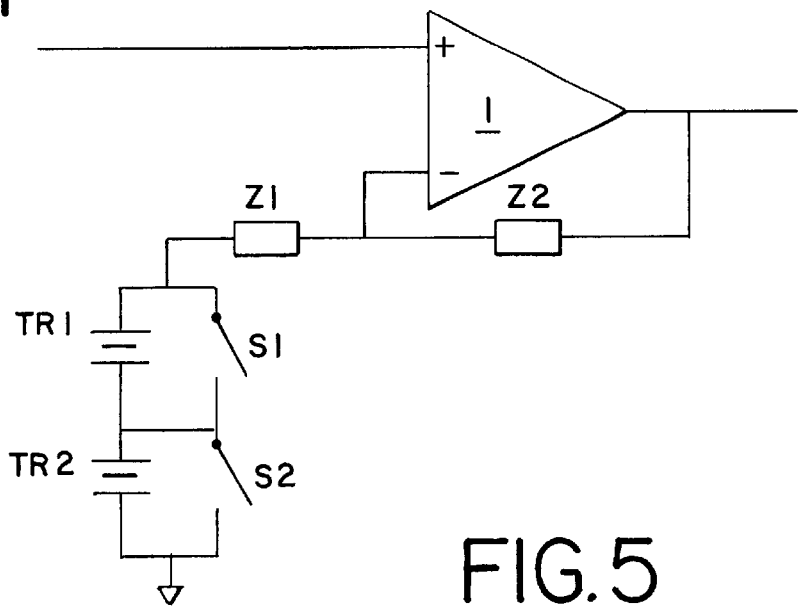
FIG. 4 shows a fourth embodiment, substantially corresponding to FIG. 1, in which the switching means are arranged in parallel with each of the transducers in order to bypass the non-used transducer, and the transducers are arranged in series between a reference potential and the first input terminal of the amplifier.

In relation to the embodiment shown in FIG. 1, the alternative circuit examples shown in FIGS. 2, 3 and 4 all have the disadvantage that the transducers must be separated from the reference potential. The embodiment shown in FIG. 2 has exactly the same function as the one shown in FIG. 1, as the demands on the switches S1, S2 are the same for both circuits, namely a moderate resistance when the switch is closed and a large damping when the switch is open. The two other alternatives shown in FIGS. 3 and 4 are more difficult to realise in practice, as they require the resistance of the switches in the closed position to be substantially lower than the transducer impedances to avoid cross talk. As the transducer impedances are typically in the range below a few hundred ohms, this may be a problem, which could be solved, however, by inserting serial resistors in each transducer branch.

Even though the transducers in the figures are shown as pure transducer crystals, they are of course understood to be potentially comprising passive serial and parallel impedances and possible signal transformers for galvanic separation. Further, the circuits are only shown with two transducers, in practice, however, from 2 to N transducers are possible to meet the requirements of measuring pipes with several tracks.

Figure 5:
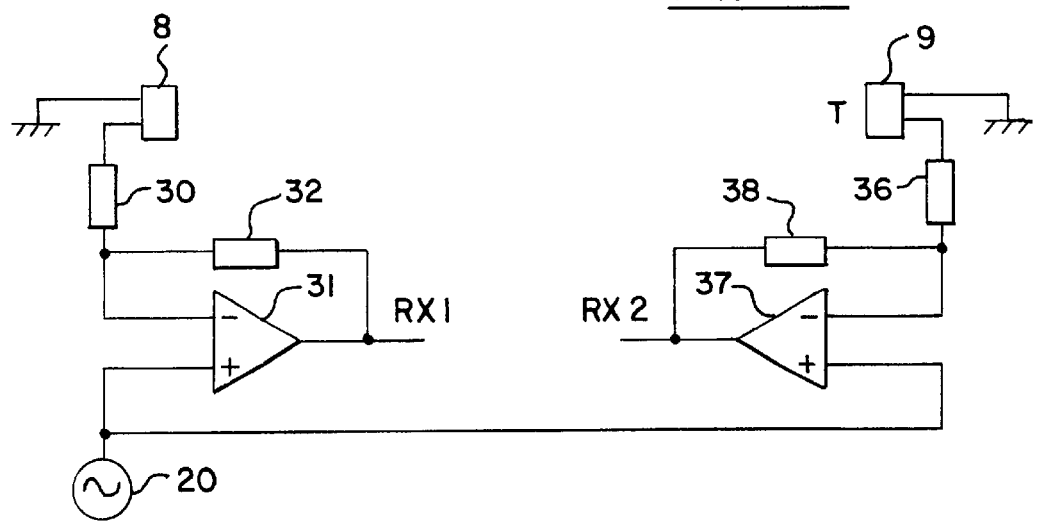
FIG. 5 shows the prior art circuit of WO 94/17371.

FIG. 5 illustrates FIG. 5 of the prior art of WO 94/17371 discussed above.

The signal generator 20 is directly connected to the non-inverting inputs of the amplifiers 31, 37 while the outputs of the amplifiers 31, 37 (RX1, RX2) are connected either to two processors (not shown) or to a single multiplexing unit. The signal generator 20 will generate a signal for a given period and would then be switched off to allow the circuit to receive. Typically, the drive signal will be on for a period equivalent to twice the average time of flight and will be off for about a duration corresponding to the average time of flight. In this circuit, the transducer 8 is connected via a damping resistor 30 to the inverting input of an operational amplifier 31. The output from the amplifier 31 is fed back through a feedback resistor 32 to the inverting input. The transducer 9 is connected in a similar manner via a damping resistor 36 to the inverting input of an operational amplifier 37. A feedback resistor 38 is connected between the output of the operational amplifier 37 and the inverting input of the operational amplifier.

What is claimed is:

1. Transmitting and receiving circuit for an ultrasonic flowmeter, comprising
   a. at least two ultrasonic transducers arranged for transmission and receipt of ultrasonic signals in opposite directions across a measuring distance,
   b. a signal source for controlled generation of electrical signals for transmission to the ultrasonic transducers,
   c. detection means for deriving transmission time measurements, used to calculate the flow, measuring of which is desired,
   d. an amplifier,
   e. the amplifier having a first inverting input terminal for connection to an ultrasonic transducer,
   f. the amplifier having a second non-inverting input terminal for connection to the signal source,
   g. an output terminal of the amplifier for connection with the detection means,
   h. a feedback connection between the output terminal and the first input terminal, and
   i. switching means for alternating functional connection of one of the ultrasonic transducers with the first input terminal for directing the electrical signals from the signal source to one of the ultrasonic transducers and for directing the received signals from an ultrasonic transducer to the amplifier.

2. Circuit according to claim 1, in which the functionally connected transducer is connected between the first input terminal of the amplifier and a reference potential.

3. Circuit according to claim 1, in which the functionally connected transducer is connected between the first input terminal of the amplifier and the output terminal of the amplifier.

4. Circuit according to claim 1, in which each ultrasonic transducer is connected in series with one of the switching means, and the connected transducers and switches are connected in parallel.

5. Circuit according to claim 1, in which each ultrasonic transducer is connected in parallel with one of the switching means, and the thus-connected transducers and switches are connected in series.

6. Circuit according to claim 1, including use of an ultrasonic frequency between 500 KHz and 2 MHz.

7. Circuit according to claim 1, including a measuring pipe with N of the transducers, N being larger than or equal to 2.

* * * * *